(12) United States Patent
An et al.

(10) Patent No.: US 9,001,287 B2
(45) Date of Patent: Apr. 7, 2015

(54) DISPLAY APPARATUS COMPRISING A FRONT MEMBER AND A REAR MEMBER WHEREIN A BENT PORTION OF THE REAR MEMBER IS RECEIVED WITHIN AN ACCOMMODATING SPACE OF THE FRONT MEMBER

(75) Inventors: Jun-seok An, Suwon-si (KR); Dae-hyoun Byoun, Seoul (KR); Myeong-kuk Jin, Hwaseong-si (KR); Seung-bum Kim, Seoul (KR); Young-chul Kim, Yeosu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 12/961,078

(22) Filed: Dec. 6, 2010

(65) Prior Publication Data

US 2011/0134359 A1    Jun. 9, 2011

(30) Foreign Application Priority Data

Dec. 9, 2009   (KR) .................. 10-2009-0122046

(51) Int. Cl.
| | |
|---|---|
| *G02F 1/1335* | (2006.01) |
| *F21V 7/04* | (2006.01) |
| *G09F 13/04* | (2006.01) |
| *H04N 5/64* | (2006.01) |
| *G06F 1/16* | (2006.01) |
| *G02F 1/1333* | (2006.01) |
| *F21V 8/00* | (2006.01) |

(52) U.S. Cl.
CPC ............... *H04N 5/64* (2013.01); *G06F 1/1601* (2013.01); *G02F 1/133308* (2013.01); *G02B 6/0085* (2013.01); *G02B 6/009* (2013.01); *G02B 6/0055* (2013.01); *G02F 2001/133314* (2013.01); *G02F 2001/13332* (2013.01)

(58) Field of Classification Search
USPC ............ 349/60–65; 362/97.2–97.4, 600, 608, 362/612, 615, 632–634
See application file for complete search history.

(56) References Cited

U.S. PATENT DOCUMENTS

| | | | |
|---|---|---|---|
| 7,742,121 | B2 | 6/2010 | Mori et al. |
| 8,477,254 | B2 | 7/2013 | Kujiraoka et al. |

(Continued)

FOREIGN PATENT DOCUMENTS

| | | |
|---|---|---|
| CN | 1612022 A | 5/2005 |
| CN | 101526183 A | 9/2009 |

(Continued)

OTHER PUBLICATIONS

Communication dated Apr. 22, 2013 from the European Patent Office in counterpart application No. 10193786.0.

(Continued)

*Primary Examiner* — Paul Lee
(74) *Attorney, Agent, or Firm* — Sughrue Mion, PLLC

(57) ABSTRACT

Disclosed is a display apparatus which is light and slim in its external appearance. The display apparatus includes a display panel which displays an image signal; a backlight unit which provides light to the display panel; a front member which includes a body whose central portion is open such that an image displayed on the display panel can be frontwardly exposed, and a support unit which supports the display panel and the backlight unit in the inner side of the body; and a rear member which is coupled to the front member and supports the back side of the backlight unit.

16 Claims, 13 Drawing Sheets

(56) References Cited

U.S. PATENT DOCUMENTS

| | | |
|---|---|---|
| 2005/0088586 A1 | 4/2005 | Mori et al. |
| 2006/0104086 A1 | 5/2006 | Ura |
| 2008/0297695 A1* | 12/2008 | Sekiguchi et al. .............. 349/65 |
| 2009/0015748 A1 | 1/2009 | Kujiraoka et al. |
| 2009/0268124 A1 | 10/2009 | Kujiraoka et al. |
| 2010/0066937 A1* | 3/2010 | Yamashita et al. .............. 349/58 |

FOREIGN PATENT DOCUMENTS

| | | |
|---|---|---|
| JP | 2000029004 A | 1/2000 |
| JP | 2003-279954 A | 10/2003 |
| JP | 200820557 A | 1/2008 |

OTHER PUBLICATIONS

Communication dated Sep. 6, 2013 issued by the European Patent Office in counterpart European Patent Application No. 10193786.0.

Communication dated May 4, 2014 issued by the State Intellectual Property Office of the People's Republic of China in counterpart Chinese Patent Application No. 201010580565.3.

Communication dated Jul. 7, 2014 issued by the European Patent Office in counterpart European Patent Application No. 10193786.0.

\* cited by examiner

DISPLAY APPARATUS COMPRISING A FRONT MEMBER AND A REAR MEMBER WHEREIN A BENT PORTION OF THE REAR MEMBER IS RECEIVED WITHIN AN ACCOMMODATING SPACE OF THE FRONT MEMBER

CROSS-REFERENCE TO RELATED APPLICATION

This application claims priority from Korean Patent Application No. 10-2009-0122046. filed on Dec. 9, 2009 in the Korean Intellectual Property Office, the disclosure of which is incorporated herein by reference in its entirety.

BACKGROUND

1. Field

Apparatuses consistent with the exemplary embodiments relate to a display apparatus, and more particularly, to a display apparatus with an improved structure.

2. Description of the Related Art

A display apparatus is an apparatus which processes and displays an input image signal.

In general, a display apparatus includes a display unit which displays an image signal, a driving circuit which receives and processes the image signal in such a manner that it can be displayed on the display unit, and so on. The display unit includes a display panel which displays the image signal, a backlight unit, and so on. The driving circuit includes an image processing unit which receives and processes the image signal in such a manner that it can be displayed on the display panel, and a power supply unit which supplies power to the display unit and the image processing unit, and so on.

An example of such a display apparatus may include a television (TV) which receives and displays broadcasting signals provided by broadcasting stations or external image signals such as digital versatile disk (DVD) signals and so on.

In general, in addition to the display panel which displays the image signal and the backlight unit which provides light to the display panel, the display unit of the display apparatus includes various support means, such as front and rear casings, which support the display panel and the backlight, and a heat radiating means which radiates heat generated in the backlight.

SUMMARY

One or more exemplary embodiments provide a display apparatus which is light and slim in its external appearance. Also, one or more exemplary embodiments are not required to provide the advantages described above, and an exemplary embodiment of the general inventive concept may not provide any of the advantages described above.

The foregoing and/or other aspects may be achieved by providing a display apparatus including: a display panel which displays an image signal; a backlight unit which provides light to the display panel; a front member which includes a body whose central portion is open such that an image displayed on the display panel can be frontwardly exposed, and a support unit which supports the display panel and the backlight unit in the inner side of the body; and a rear member which is coupled to the front member and supports the back side of the backlight unit.

The backlight unit may further include a light source which emits light to be provided to the display panel, and heat generated in the light source may be radiated through the front member.

The support unit of the front member may include an opening which exposes the image displayed on the display panel frontward, a panel support which accommodates and supports the display panel, and a backlight support which accommodates and supports the backlight unit.

The backlight unit may include a light source which emits light to be provided to the display panel, and a light guide plate which supplies the light emitted from the light source uniformly, and the light source may be arranged as an edge type light source disposed along at least one lateral side of the light guide plate, and heat generated in the light source is radiated through the backlight support of the front member.

The light source may include at least one LED and an LED board which supports the LED, and the at least one LED board may be coupled to the backlight support of the front member.

The front member may include a material having high thermal conductivity.

The rear member may include a material having high thermal conductivity.

The rear member may include a rear bent part whose edge is frontward bent, and the body of the front member includes a rear bent accommodating part disposed in a back side of the body of the front member and configured to accommodate the rear bent part of the rear member such that the front member is coupled to the rear member.

The display apparatus may further include a cover member which is disposed on a front side of the front member.

The cover member may include a cover bent part whose edge is rearward bent, and a cover bent accommodating part disposed in the front side of the body of the front member and configured to accommodate the cover bent part of the cover member such that the cover member is coupled to the front member.

The cover member may include a cover support which supports a front edge of the display panel, and an opening which is formed in an inner end portion of the cover support in order to expose the image displayed on the display panel frontward.

The display apparatus may further include at least one of an auxiliary sheet which is interposed between the backlight support and the light guide plate which contacts the backlight support, and a protection sheet which is interposed between the panel support and the display panel which contacts the panel support.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
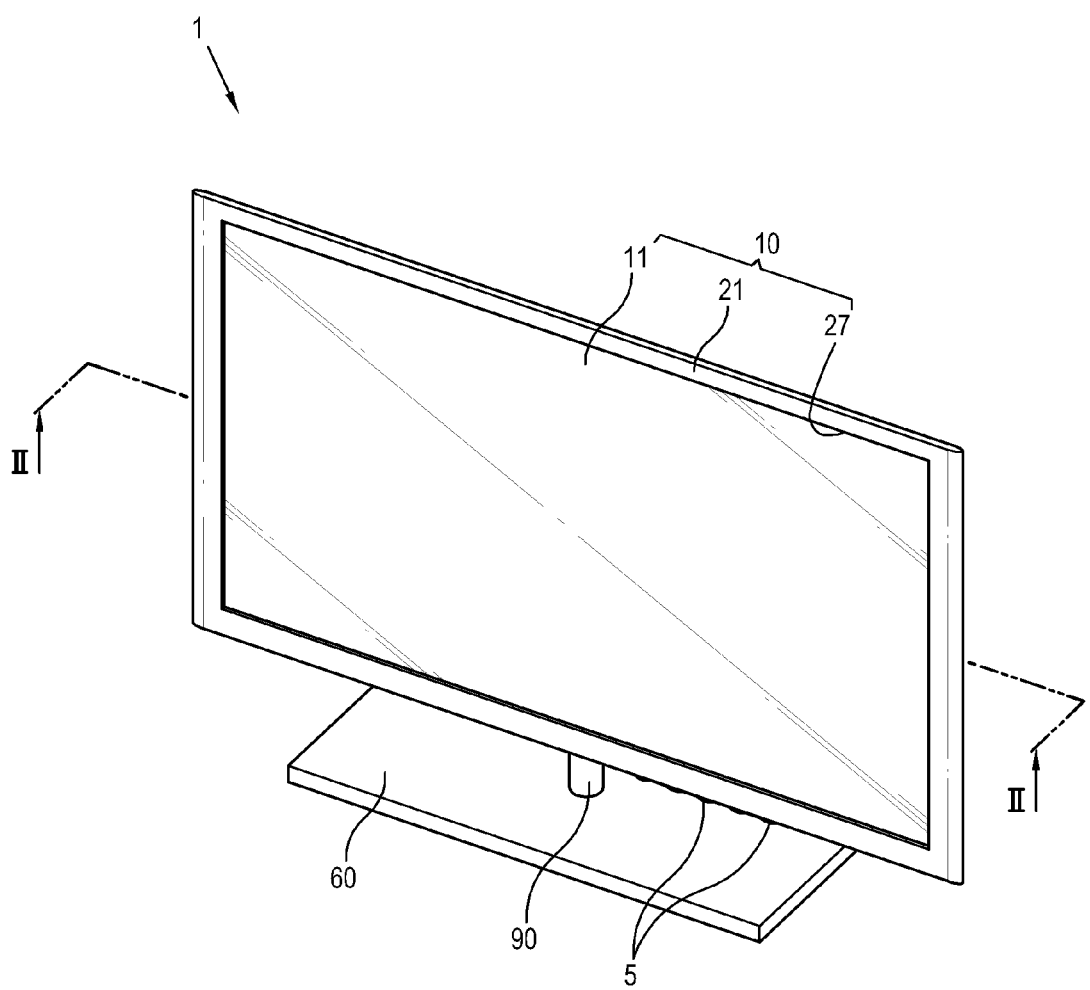
FIG. 1 is a perspective view of a display apparatus according to one exemplary embodiment.

Below, certain exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted since they would obscure the general inventive concept with unnecessary detail, and like reference numerals refer to like elements throughout.

Referring to FIGS. 1 to 5, a display apparatus 1 according to an exemplary embodiment of the general inventive concept includes a display panel 11 which displays an image signal, a backlight unit 13 which provides light to the display panel 11, a front member 21 which includes a support 25 which accommodates and supports the display panel 11 and the backlight unit 13 in such a manner that an image displayed on the display panel 11 can be exposed in the front, and a rear member 35 which is combined with the front member 21 and supports the rear side of the backlight unit 13. As one example, the display apparatus 1 may include a display unit 10 which forms an image, a body unit 60 which accommodates internal parts such as various boards, hardware and so on which output power and an image signal to the display unit 10, and a stand unit 90 which is interposed between the display unit 10 and the body unit 60 and is supported by the body unit 60. However, the internal parts such as various boards, hardware and so on which are accommodated in the body unit 60 are not separated from, but are instead integrated with the display unit. In this case, the body unit 60 and the stand unit 90 may be used as a support means, such as a stand, which supports the display unit 10 and may not be separately provided in a case of a wall-mountable display apparatus.

Figure 2:
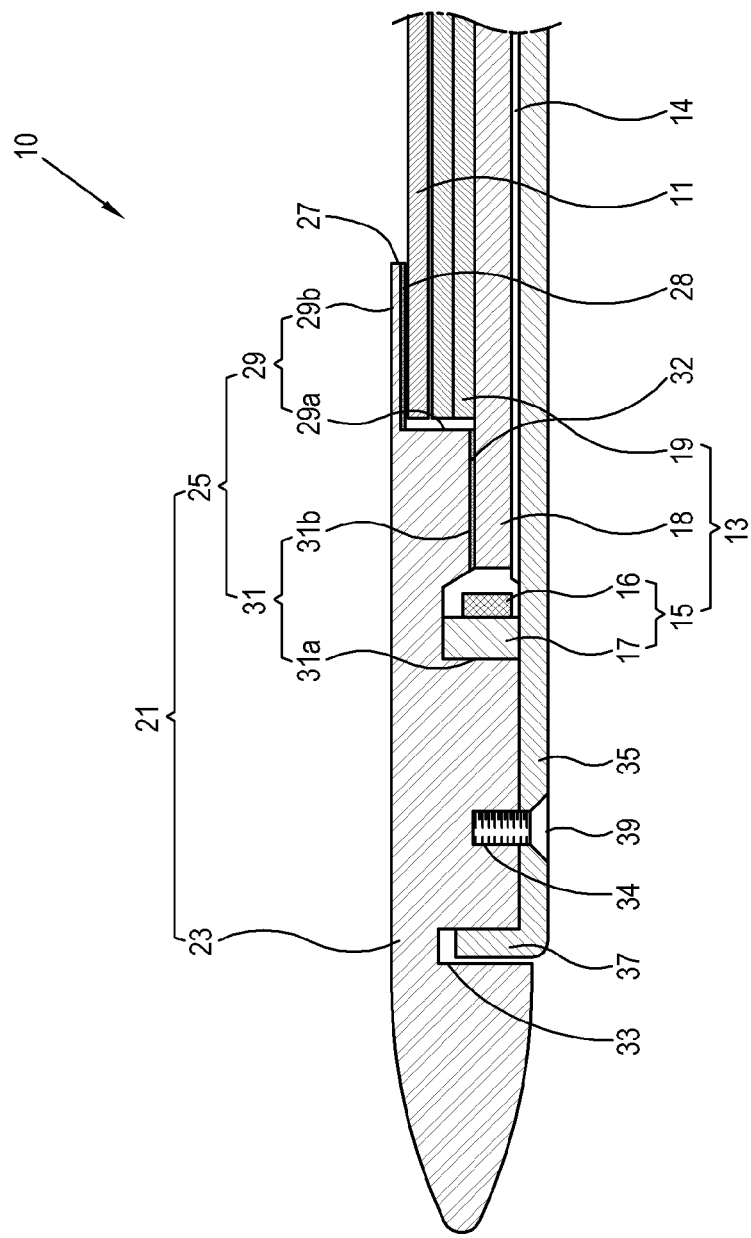
FIG. 2 is a sectional view taken along line II-II of FIG. 1.
Figure 3:
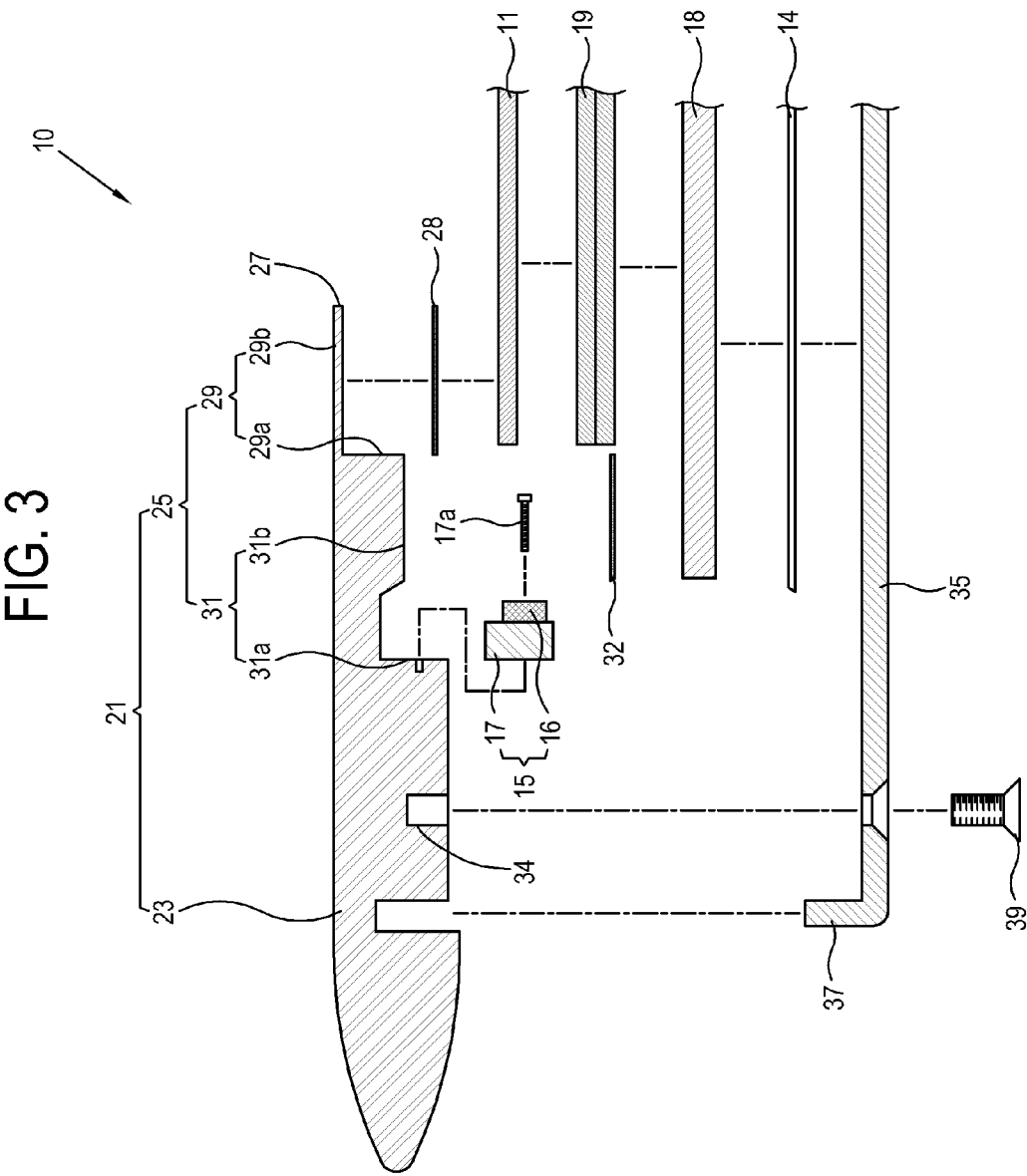
FIG. 3 is a partially-exploded sectional view of a display unit of the display apparatus shown in FIG. 2.

As shown in FIGS. 1 to 3, the display unit 10 may include the display panel 11, the backlight unit 13, the front member 21 and the rear member 35. The display unit 10 may further include a user input unit 5. As one example, the user input unit 5 is formed in the front member 21 and includes a plurality of functional keys to allow a user to perform broadcasting channel change, screen control, volume control and the like. As one example, the user input unit 5 is formed to project downward from the bottom of the front member 21, but without being limited thereto, may be formed in the front or sides of the front member 21. It is to be understood that the user input unit 5 of the display apparatus 1 according to the exemplary embodiment of the general inventive concept may include a remote controller receiving unit (not shown) which can receive a signal output from a separate remote controller (not shown). In this case, according to one exemplary embodiment of the general inventive concept, when the internal parts such as various boards, hardware and so on are accommodated in the body unit 60, the user input unit 5, the remote controller receiving unit (not shown) and so on may be electrically connected to the internal parts accommodated in the body unit 60 via a connection cable 76 (see FIG. 8) which is accommodated or installed in the stand unit 90. Such a connection cable 76 may be provided in various forms including wires, a flexible printed circuit board (FPCB), etc.

As one example, the display panel 11 is a liquid crystal display (LCD) panel. In this embodiment, the backlight unit 13 includes a light source 15 which emits light to be provided to the display panel 11, a light guide plate 18 which makes the light emitted from the light source 15 uniform, and an optical sheet 19 which is disposed in the front of the light guide plate 18 and includes a diffusing film which diffuses the light supplied from the light guide plate 18, a prism film and the like. In addition, the backlight unit 13 further includes a reflection sheet 14 which is disposed in the rear of the light guide plate 18, between the light guide plate 18 and the rear member 35, and reflects the light emitted from the light source 15 toward the display panel 11.

As one example, the light source 15 is constituted by light emitting diodes (LEDs) and is provided as an edge type light source in which the LEDs are disposed on at least one side of the light guide plate 18. That is, the light source 15 may be disposed on one side, or two opposite sides, or three or four sides of the light guide plate 18. However, the light source 15 may be provided as a direct type light source in which LEDs are arranged at the rear side of the light guide plate 18. For such a direct type light source, heat generated in the light source 15 may be radiated through the rear member 35 as it is transferred to the front member 21.

As one example, the light source 15 may include LEDs 16 and an LED board 17 which supports the LEDs 16. The light source 15 may be used in various forms including a line light source, such as a cold cathode fluorescent lamp (CCFL) or an external electrode fluorescent lamp (EEFL), or a point light source, such as a carbon nano tube (CNT). As one example, the LED board 17 is coupled to the front member 21 through which heat generated in the LEDs 16 is radiated. In this case, the LED board 17 may be formed of a metal board with high thermal conductivity on which a plurality of LEDs 16 are mounted, and may be formed such that electrodes connected to the LEDs 16 are patterned inside or on the LED board 17.

As one example, the front member 21 forms an external front appearance of the display unit 10. The front member 21 may be made of a material with high thermal conductivity, for example, an aluminum alloy, but without being limited thereto, may be made of other material such as plastic. The front member 21 includes a body 23 whose central portion is open such that an image displayed on the display panel 11 can be exposed in the front, and the support 25 which accommodates and supports the display panel 11 and the backlight unit 13 in the inner side of the body 23 such that the image displayed on the display panel 11 can be exposed.

The body 23 is made of a material with high thermal conductivity such that heat generated by the LEDs 16 can be radiated. Thus, in this exemplary embodiment, heat generated by the light source 15 can be easily discharged to the body 23 of the front member 21 through the LED board 17. Accordingly, the display apparatus 1 can achieve its structural simplicity, production cost reduction, lightness and slim external appearance. In addition, in this exemplary embodiment where the light source is arranged on one to four sides of the bottom of the display panel 11 and the central region of the body 23 is provided in the form of a rectangular frame opened to form an opening 27, the heat generated in the edge type light source is transferred along the rectangular frame of the body 23. Accordingly, it is possible to prevent a deflection effect which may be caused by a temperature difference between the light source and the central region of the body 23.

The support 25 may include the opening 27 which exposes an image displayed on the front of the display panel 11, a panel support 29 which accommodates and supports the display panel 11, and a backlight support 31 which accommodates and supports the backlight unit 13.

The panel support 29 forms an accommodation space to accommodate the display panel 11 in the inner side of the body 23 and is provided to support the front side of an edge of the display panel 11. As one example, the panel support 29 may include a panel accommodating part 29a which forms an accommodation space to accommodate the display panel 11, and a front supporting part 29b which supports a front edge of the display panel 11. Thus, the panel support 29 can prevent the display panel 11 from separating from the front of the front member 21. A protection sheet 28 may be provided between the front supporting part 29b and the display panel 11. The protection sheet 28 can prevent a contact surface of the display panel 11 from being scratched by the front supporting part 29b.

The backlight support 31 forms an accommodation space to accommodate and support the backlight unit 13 in the inner side of the body 23. As one example, the backlight support 31 may include a light source supporting part 31a which accommodates and supports the light source 15, and a light guide plate supporting part 31b which supports an upper region of the light guide plate 18.

Figure 4:
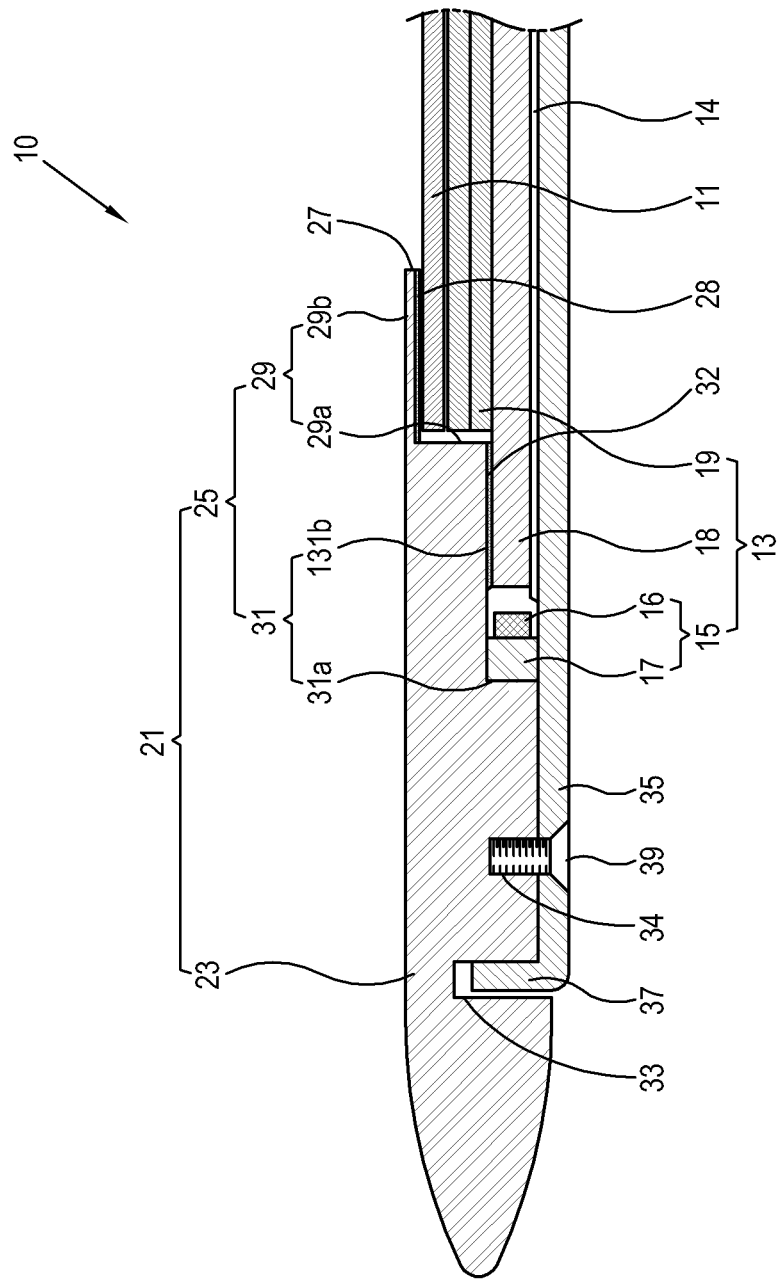
FIG. 4 is a partial sectional view showing another exemplary embodiment of a front member of the display unit of the display apparatus shown in FIG. 2.

As one example, the light guide plate supporting part 31b is formed to extend from and have a step portion which extends backwardly from the light source supporting part 31a. However, without being limited thereto, the light guide plate supporting part 31b may be formed to extend from and in parallel to the light source supporting part 31a without having the step portion, as shown in FIG. 4. The display unit 10 shown in FIG. 4 has the same configuration as those shown in FIGS. 2 and 3 except for a shape of the light guide plate supporting part 31b, and therefore, detailed explanation thereof will be omitted.

As one example, an auxiliary sheet 32 may be provided between the light guide plate supporting part 31b and the light guide plate 18. The auxiliary sheet 32 can prevent a contact surface of the light guide plate 18 from being scratched by the light guide plate supporting part 31b. In addition, the auxiliary sheet 32 may be attached to the contact surface of the light guide plate 18 with the light guide plate supporting part 31b such that the auxiliary sheet 32 performs a reflection function to allow light incident from the light source to be directed toward the display panel 11.

Figure 5:
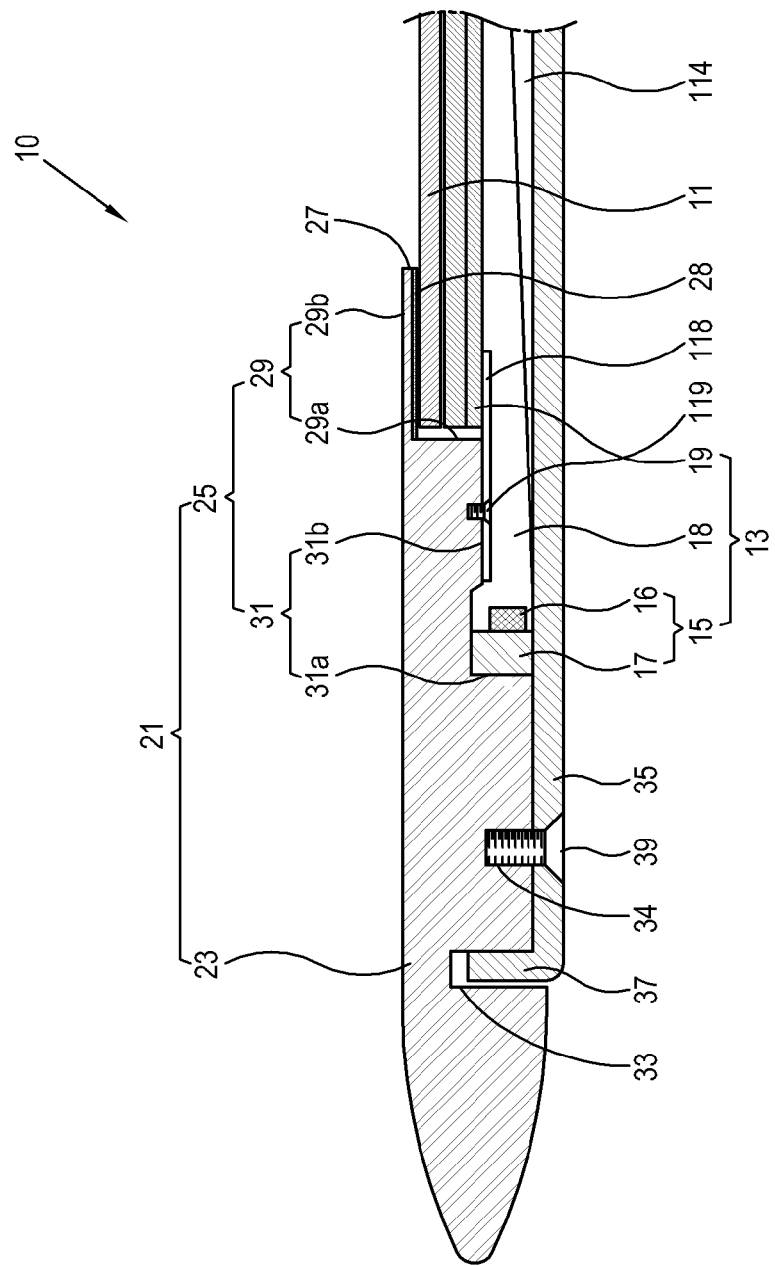
FIG. 5 is a partial sectional view showing another exemplary embodiment of a backlight unit of the display unit of the display apparatus shown in FIG. 2.

As one example, as shown in FIG. 5, in the backlight unit 13 of the display apparatus 1 of this exemplary embodiment, the light source 15 may be disposed in a rear lateral side of the display panel 11 without a separate light guide plate, and a reflection sheet 114 may be disposed on the front of the rear member 35 with an inclined surface which is inclined by a predetermined angle in such a manner that a central region of the reflection sheet 114 projects in the front. In case of such a backlight unit 13, light emitted from the light source 15 disposed in the lateral side of the display panel 11 is directed toward the display panel 11 after being reflected by the reflection sheet 114 and then diffused and condensed by the optical sheet 19 disposed on the rear of the display panel 11. If a light guide plate is not separately provided in this manner, as one example, an optical sheet supporting part 118 may be fastened to the light guide plate support part 31b by various fastening means such as screws 119 to support the optical sheet 19.

Although the optical sheet 19 is depicted to have substantially the same size as the display panel 11 and to be accommodated in the panel accommodating part 29a of the panel support 29 along with the display panel 11, a separate optical sheet accommodating part (not shown) to accommodate the optical sheet 19 or a position guiding part (not shown) to guide a position of the optical sheet 19 may be provided in at least one region of the panel support 29 or the light guide plate supporting part 31b.

As one example, the LED board 17 may be fastened to the light source supporting part 31a by a screw 17a (see FIG. 3) or the like. However, without being limited to a screw, this fastening may be achieved by an adhesive, an adhesive tape, or an elastic clip which closely presses the LED board 17 against the light source supporting part 31a. That is, the LED board 17 may make direct contact with the light source supporting part 31a by means of the screw 17a or the like, or may be adhered to the light source supporting part 31a by a thermally-conductive adhesive tape or the like, or may be fastened to the light source supporting part 31a using a combination thereof. Thus, heat generated in the LEDs 16 can be radiated through the backlight support 31 as it is transferred to the body 23 of the front member 21.

As one example, the rear member 35 forms an external appearance of the rear of the display unit 10. Like the front member 21, the rear member 35 may be made of a material with high thermal conductivity, for example, an aluminum alloy, but without being limited thereto, may be made of other material such as plastic. Thus, the display apparatus of this exemplary embodiment can radiate the heat generated in the light source 15 through the rear member 35 as well as the front member 21.

The rear member 35 is provided as a plate-like member to cover and support the entire rear of the backlight unit 13 and its edge is coupled to the front member 21. As one example, the rear member 35 is fastened by a screw 39 to a screw joint 34 formed in the rear side of the body 23 of the front member 21. However, without being limited thereto, this fastening may be achieved by an adhesive, an adhesive tape, or an elastic clip which closely presses the rear member 35 against the front member 21. This can prevent the display panel 11 from separating in the rear by the rear member 35. In addition, as one example, a rear bent part 37, which is forwardly bent, is provided at the edge of the rear member 35, and a rear bent part accommodating part 33 to accommodate the rear bent part 37 of the rear member 35 is provided in the rear side of the body 23 of the front member 21. This enables the rear member 35 to be coupled to the front member 21 more stably and elegantly.

Figure 6:
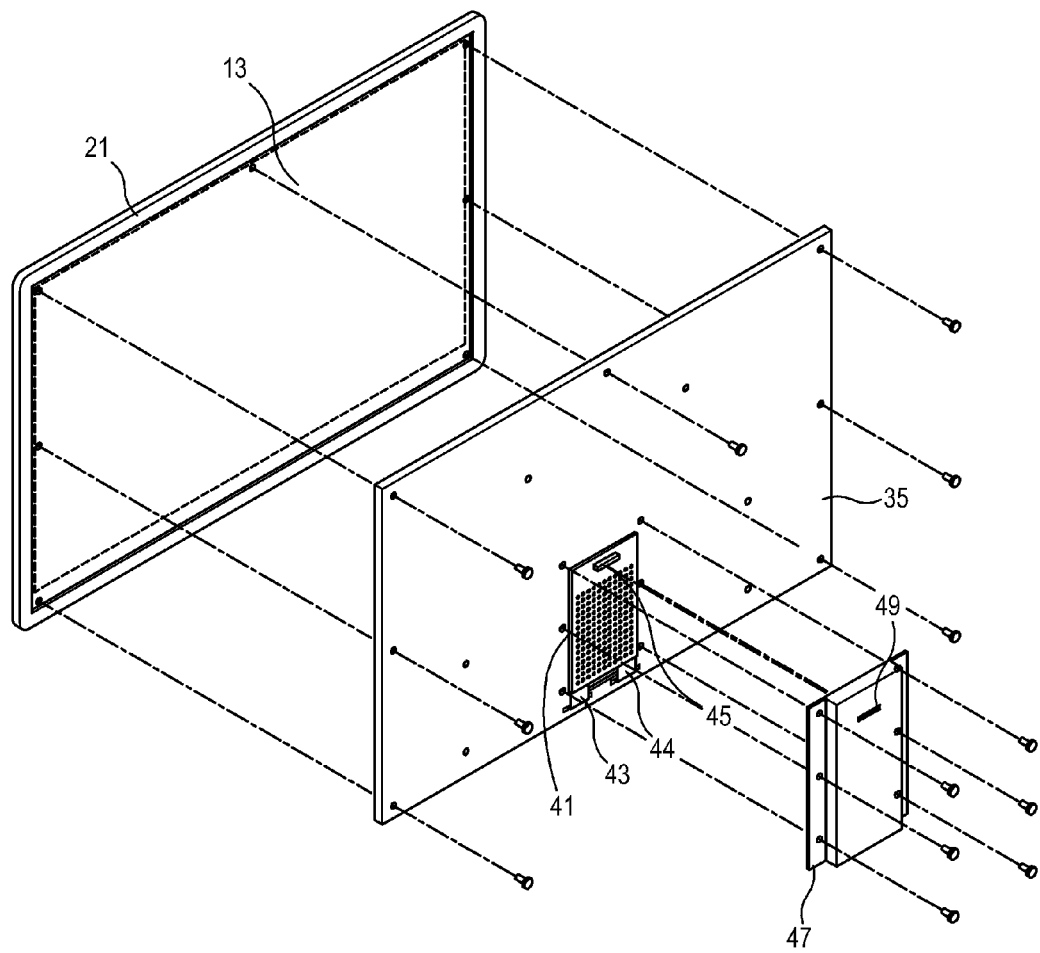
FIG. 6 is an exploded perspective view of the display unit of the display apparatus shown in FIG. 1.

As one example, as shown in FIG. 6, a panel driving board 41 is mounted on the rear region of the display unit 10.

The panel driving board 41 may include a timing controller which controls a time difference which occurs when an image signal input from the body unit 60, which will be described later, is displayed on the display panel 11.

As one example, a display connector 45 is mounted on the panel driving board 41. In addition, an image cable 43 and a power cable 44, through which an image signal and power delivered via the display connector 45 are respectively supplied to the display panel 11 and the backlight unit 13, are connected to the panel driving board 41. As one example, the panel driving board 41 is mounted on the back side of the rear member 35. In addition, a board cover member 47 may be separately provided to cover the panel driving board 41 mounted on the back side of the rear member 35. As one example, a display connector opening 49, through which the display connector 45 mounted on the panel driving board 41 is exposed, is formed in the board cover member 47. However, without being limited thereto, the panel driving board 41 may be interposed between the reflection sheet 14 of the backlight unit 13 and the rear member 35. In this case, a separate board cover member 47 may be omitted since a portion of the rear member 35 in which the panel driving board 41 is disposed is formed to project in the rear and the display connector opening 49 is provided in the form of a through hole (not shown) formed in the rear member 35. In addition, since a stand part 93 (see FIG. 7) of the stand unit 90 is configured to cover the panel driving board 41, a separate board cover member 47 may be omitted.

Figure 7:
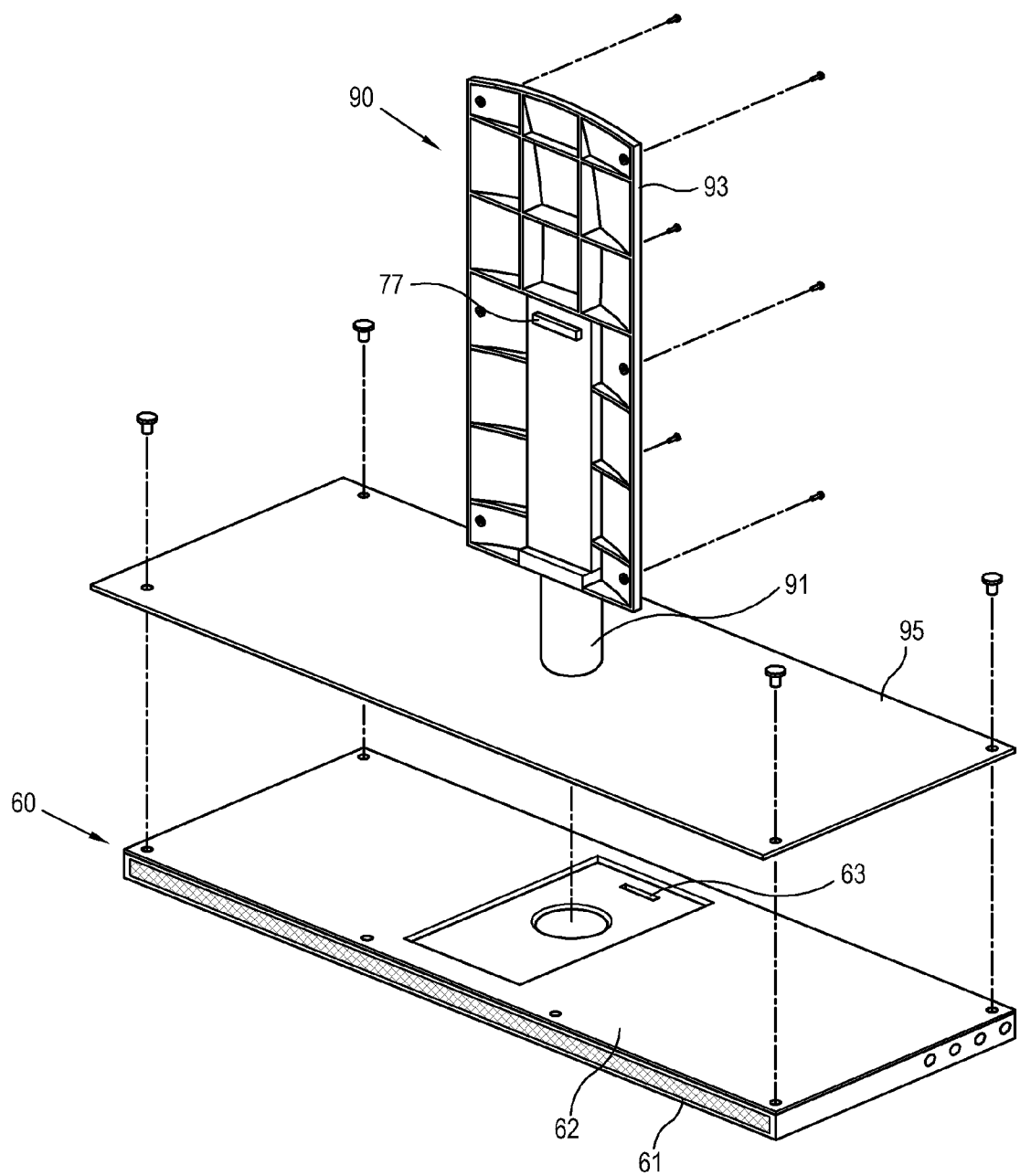
FIG. 7 is a perspective view of a stand unit of the display apparatus shown in FIG. 1.
Figure 9:
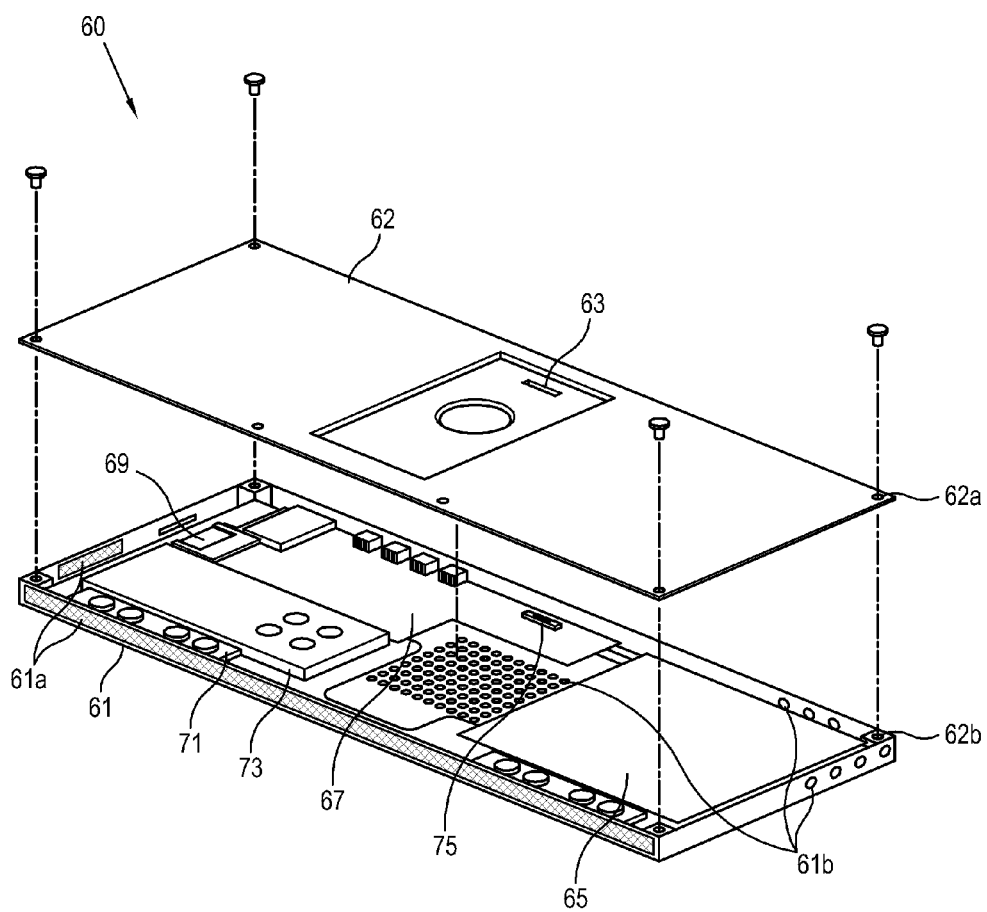
FIG. 9 is an exploded perspective view of a main body of the display apparatus shown in FIG. 1.
Figure 10:
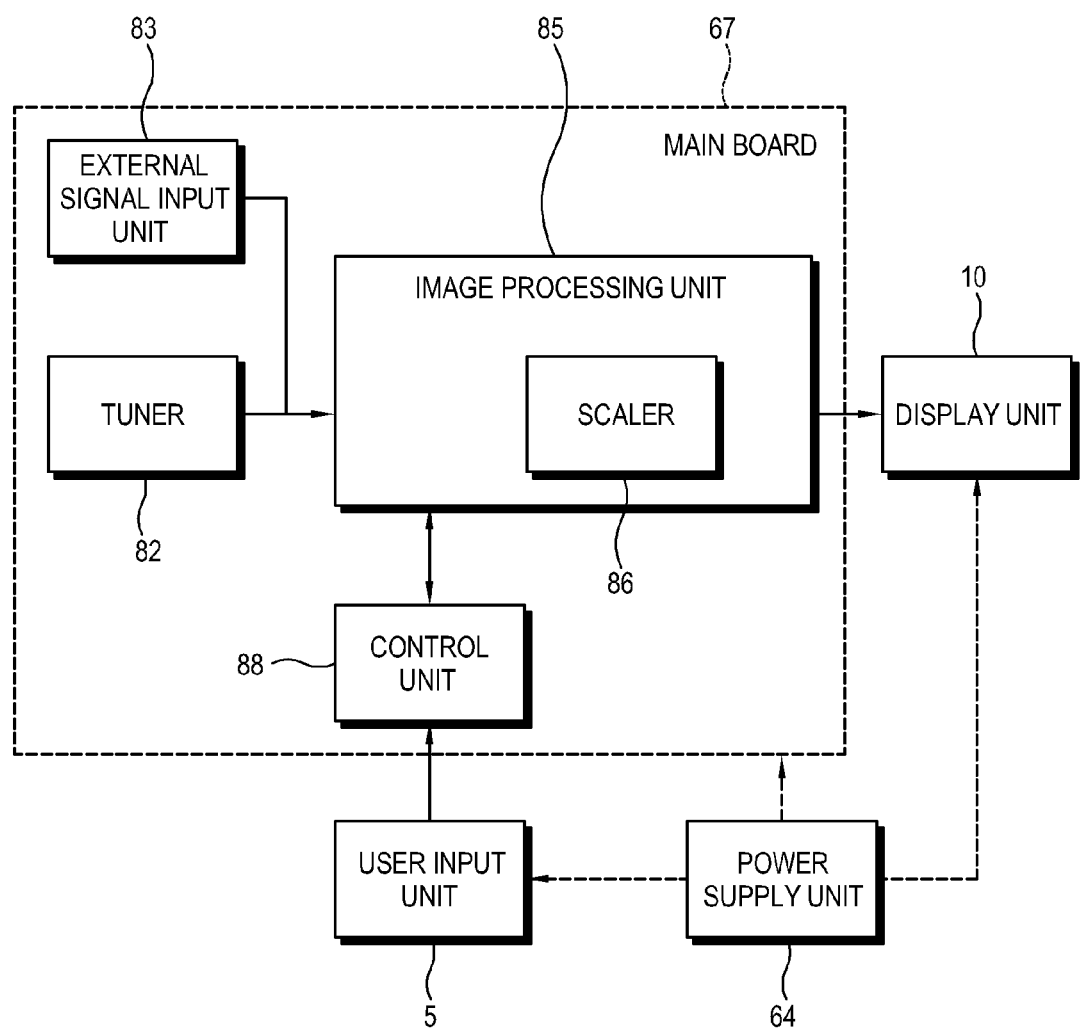
FIG. 10 is a control block diagram of an display apparatus according to one exemplary embodiment.

As shown in FIGS. 7, 9 and 10, in this exemplary embodiment, the body unit 60 of the display apparatus 1 includes a body casing 61 which forms an external appearance, a power board 65 which is accommodated in the body casing 61 and includes a power supply unit 64 formed thereon, and a main board 67 which is accommodated in the body casing 61 and has an image processing unit 85 formed thereon. The body unit 60 may further include at least one of a tuner 82 which receives broadcasting signals provided by broadcasting stations and an external signal input unit 83 which receives external signals such as digital versatile disk (DVD) signals. That is, it is shown in this exemplary embodiment that the body unit 60 includes both the tuner 82 and the external signal input unit 83, but without being limited thereto, the body unit 60 may include only one of the tuner 82 and the external signal input unit 83. The body unit 60 may further include a speaker 71.

As one example, as shown in FIGS. 6 and 9, the body casing 61 may be formed into a rectangular shape of predetermined height. The height of the body casing 61 may be formed to be as small as possible such that various internal components such as boards accommodated therein can be arranged side by side. This allows the body casing 61 to be made slimmer. A body cover 62 may be mounted on an upper side of the body casing 61. This allows the body casing 61 of this exemplary embodiment to be easily and securely mounted on a surface such as a table. In addition, at least a region of the front and lateral sides of the plate of the body casing 61 may be opened to easily emit sound of the speaker 71 and a woofer speaker 73 which will be described later. As one example, at least a region of the front and lateral sides of the body casing 61 may include an opening which is formed corresponding to the speaker 71 and the woofer speaker 73 and in which a net member 61a may be mounted to prevent foreign substances from being introduced therein. In addition, a plurality of through holes 61b may be formed in the plate of the body casing 61 to circulate and cool air within the body casing 61. As one example, the plurality of through holes 61b may be formed in at least a region of the bottom, lateral sides and back side of the body casing 61.

A body connector opening 63 to expose a body connector 75 is formed in the body cover 62. The body cover 62 may be fastened to the body casing 61 by means of screws which are jointed to a joint 62b of the body casing 61 through a joint hole 62a of the body cover 62. However, the body cover 62 is not limited thereto but may be fastened to the body casing 61 through various means such as hook coupling.

Thus, the body cover 62 can prevent parts accommodated in the body casing 61 from being exposed to the outside and a connection cable 76 of a connection unit, which will be described later, can be combined to the body connector 75 via the body connector opening 63.

As one example, the tuner 82 and the external signal input unit 83 are mounted on the main board 67. In addition, the main board 67 is provided with an image processing unit 85 which processes image signals input from the tuner 82 and/or the external signal input unit 83 such that the signals can be displayed on the display unit 10, and a control unit 88 which controls the image processing unit 85 and so on. In addition, the main board 67 may be mounted with a variety of connection ports including a common interface (CI) slot 69. As one example, the main board 67 may be placed in a rear region of the body casing 61 such that the variety of connection ports mounted thereon can be interconnected to various peripheral devices through the lateral sides or rear side of the body unit 60.

The image processing unit 85 processes broadcasting signals received from the tuner 82 and/or image signals received from an external imaging device such as DVD such that these signals can be displayed on the display unit 10. The image processing unit 85 may further include a scaler 86 which outputs an image signal scaled to meet a resolution of the display unit 10. That is, the image processing unit 85 performs an A/D converting function for converting input image signals of various formats into digital image signals of a predetermined format, a digital coding function, a predetermined format converting function, etc., under control of the control unit 88. The scaler 86 may receive digital and/or analog image signals and perform a scaling function for adjusting a vertical frequency, a resolution, an aspect ratio, etc. to an output standard of the display unit 10.

In this manner, the display apparatus 1 according to this exemplary embodiment can be configured to output the image signals scaled by the image processing unit 85 of the body unit 60 to the display unit 10 via the body connector 75 and the display connector 45.

The power supply unit 64 provided in the power board 65 is configured to supply required power to the body unit 60 and the display unit 10. That is, as one example, the power supply unit 64 is configured to supply power to all components which require power, including the display panel 11 of the display unit 10, the backlight unit 13 and so on, via the body connector 75 and the display connector 45. Thus, the display unit 10 can be more simply formed to be slimmer since there is no need to mount a separate power supplying connection structure, except for the image signal transfer connection unit, on the display unit 10. In addition, as one example, the power board 65 is arranged in parallel to the main board 41 and one side of a woofer speaker 73, which will be described later, in the body casing 67.

As one example, the speaker 71 is built in the body casing 61 and may be arranged in the front side of the body casing 61 such that sound can be emitted forward. However, it is to be understood that the speaker 71 may be arranged in other different locations including the rear side and left and right sides of the body casing 61. In addition, as one example, the woofer speaker 73 may be further included in the body casing 61.

As one example, the woofer speaker 73 is arranged in the body casing 61 in parallel to one side of the front side of the main board 67. However, it is to be understood that the components such as the woofer speaker 73, the power board 65 and the main board 67 mounted on the body casing 61 are not limited thereto but may be arranged in other different locations.

Figure 8:
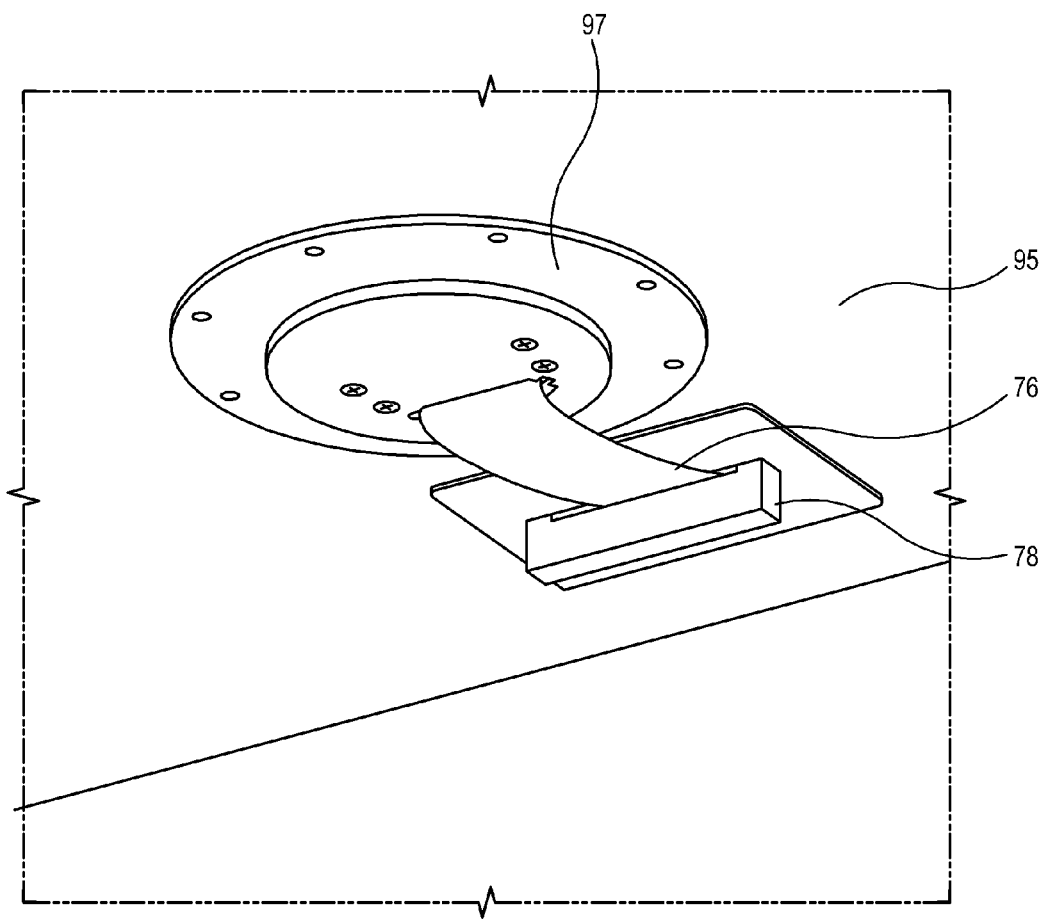
FIG. 8 is a perspective view of the bottom of the stand unit of the display apparatus shown in FIG. 1.

As shown in FIGS. 7 and 8, the connection unit may further include the connection cable 76 for interconnecting the display connector 45 and the body connector 75. Thus, the display apparatus 1 according to this exemplary embodiment is simple in its structure and is easily assembled and dissembled in that the image signals and the power can be delivered from the body unit 60 to the display unit 10 via one body connector 75, one connection cable 76 and one display connector 45.

As one example, the display connector 45 is mounted on the panel driving board 41 and may be exposed through the display connector opening 49 formed in the board cover member 47. As one example, the body connector 75 is mounted on the main board 67 and may be exposed through the body connector opening 63 formed in the body cover 62. The connection cable 76 includes a first connector 77 (see FIG. 7) and a second connector 78 (see FIG. 8) at its end portions, which can be coupled to the display connector 45 and the body connector 75, respectively. The connection cable 76 may be mounted in the inner side of a stand unit 90 which will be described later. That is, as one example, the connection cable 76 may be mounted in the inner side of the stand unit 90, which will be described later, such that the first connector 77 and the second connector 78 can be coupled to the display connector 45 and the body connector 75, respectively. Thus, the external appearance of the apparatus is simplified by preventing the connection cable 76 from being exposed to the outside.

The display apparatus 1 according to this exemplary embodiment further includes the stand unit 90 to support the display unit 10 with respect to the body unit 60 which is mounted on a mounting surface or structure such as a table. As shown in FIGS. 6 and 8, the stand unit 90 is erect and has a lower side coupled to the body unit 60 and an upper side coupled to the display unit 10. Specifically, the stand unit 90 includes a display support 93 coupled to the display unit 10, a plate-like body support 95 coupled to the body unit 60, and a stand 91 coupled to the display support 93 and the body support 95.

As one example, the stand 91 is provided in the form of a pipe having a predetermined length. As one example, the connection cable 76 passes through the inside of pipe-like stand 91. The stand 91 has an upper side coupled to the display support 93 and a lower side erected with respect to the body support 95. As one example, the stand 91 is made of metallic material to support weight of the display unit 10 but, without being limited thereto, may be made of different materials such as plastics having strength enough to support the weight of the display unit 10.

As one example, the display support 93 is formed into a plate shape which can be fastened to the rear member 35 of the display unit 10 by means of screws and the like and its lower region is coupled to an upper region of the stand 91. As one example, the display support 93 is made of plastic material to support the display unit 10 but, without being limited thereto, may be made of different materials such as metal and so on. The first connector 77 of the connection cable 76 is mounted on the display support 93 such that the first connector 77 can be coupled to the display connector 45 when the display support 93 is fastened to the rear member 35 of the display unit 10.

As one example, the body support 95 may be arranged on the upper side of the body cover 62 and may be fastened to the body cover 62 or the body casing 61 by a stand support bracket 97 (see FIG. 8) by means of screws and the like. The body support 95 is made of metal material such that the stand 91 can be erected and coupled to the plate of the body support 95. However, without being limited thereto, the body support 95 may be made of different materials such as plastics to support the stand 91. The second connector 78 of the connection cable 76 is mounted on the body support 95 such that the second connector 78 can be coupled to the body connector 75 when the body support 95 is fastened to the body cover 62 of the body unit 60.

With the above-described configuration of this exemplary embodiment, as the display apparatus 1 is provided with the body 23 whose central portions is opened in the front member 21, and the support 25 which accommodates and supports the display panel 11 and the backlight unit 13 in the inner side of the body 23 such that an image displayed on the display panel 11 can be exposed forward, structural simplicity, production cost reduction, lightness and slim external appearance can be achieved. In addition, since the central region of the body 23 is provided in the form of an opened rectangular frame and heat generated in the edge type light source is transferred along the rectangular frame of the body 23, it is possible to prevent a deflection effect which may be caused by a temperature difference between the light source and the central region of the body 23.

Figure 11:
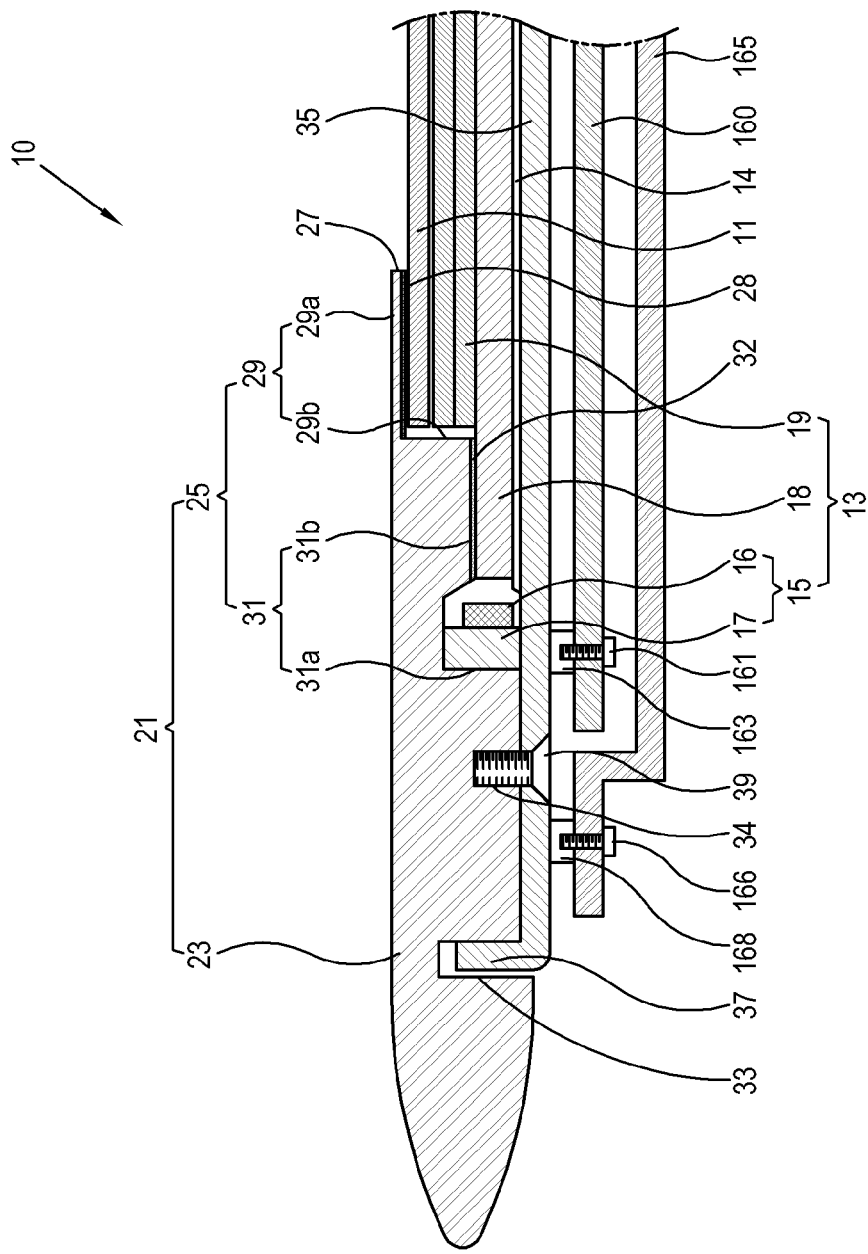
FIGS. 11 to 13 are partial sectional views of a display unit of a display apparatus according to another exemplary embodiment.

FIG. 11 is a sectional view of a display apparatus according to another exemplary embodiment of the general inventive concept. The display unit 10 of the display apparatus 1 of the exemplary embodiment shown in FIG. 11 is characterized in that a driving circuit 160 for driving the display panel 11, the backlight unit 13 and so on is mounted on the back side of the rear member 35. That is, driving circuit means for driving the display unit, such as the power board 65 and the main board 67 mounted on the body unit 60 in the above-described exemplary embodiment shown in FIG. 9 for example, are mounted on the back side of the rear member 35. As one example, the driving circuit 160 is fastened to a Penn Engineering and Manufacturing Corp. PEM nut® 163 mounted on the back side of the rear member 35 by means of a screw 161, but, without being limited thereto, may be fastened by means of other different fastening manners.

In addition, the display unit 10 of the embodiment shown in FIG. 11 may further include a rear cover 165 for covering the driving circuit 160 mounted on the back side of the rear member 35. As one example, the rear cover 165 may be fastened to a PEM nut® 168 mounted on the rear member 35 by means of a screw 166, or alternatively, may be fastened to the body 23 of the front member 11, but, without being limited thereto, may be fastened by means of other different fastening manners.

Thus, as in the exemplary embodiment shown in FIG. 11, when the driving circuit 160 is mounted on the rear member 35 of the display unit 10, the body unit 60 and the stand unit 90 can play a role as a support means for supporting the display unit 10.

Figure 12:
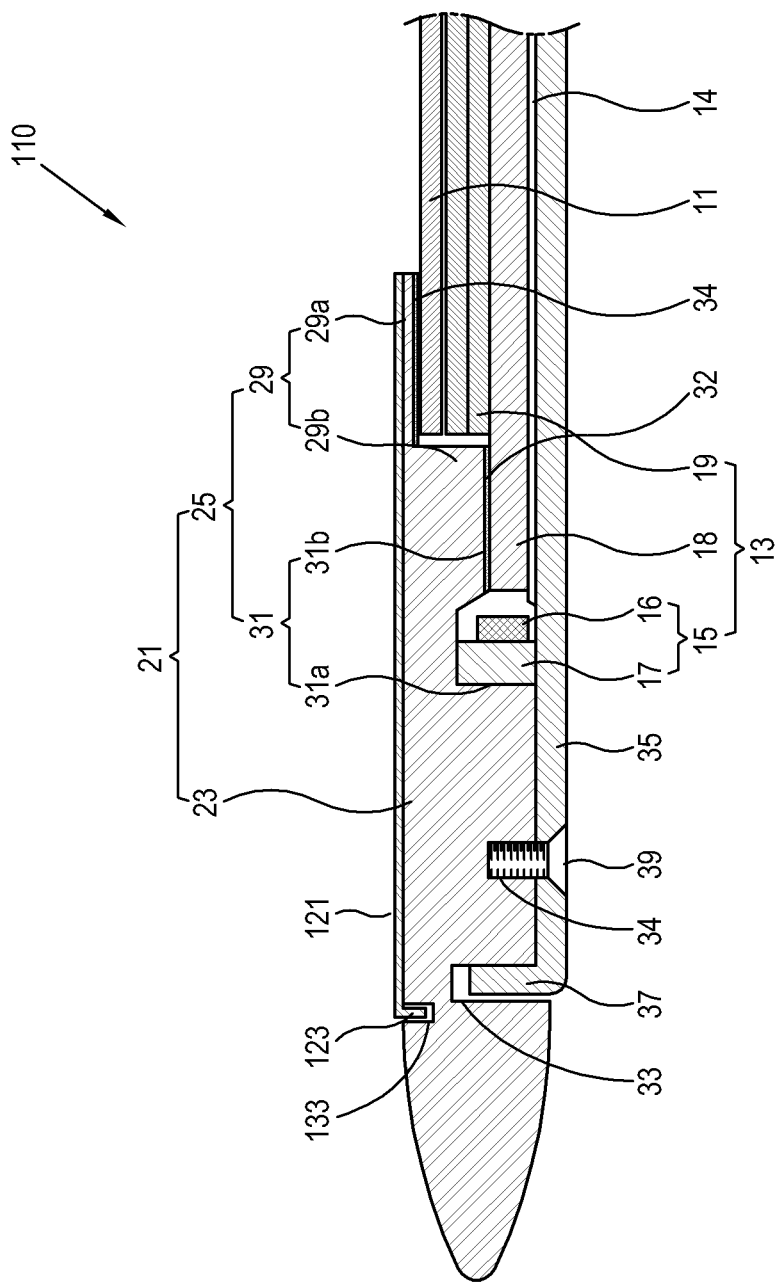

FIG. 12 is a sectional view of a display apparatus according to still another exemplary embodiment of the general inventive concept. A display unit 110 of the display apparatus 1 of the embodiment shown in FIG. 12 is characterized by a cover member 121 arranged in the front of the front member 21.

As one example, the cover member 121 may be provided in the form of a plate which may be mounted in the front of the body 23 of the front member 21. The cover member 121 may be made of a material having the same high thermal conductivity as the front member 21, but, without being limited thereto, may be made of different types of metal, plastic or glass. The cover member 121 may be fastened to the front of the front member 21 by means of screws. However, without being limited to screws, this fastening may be achieved by an adhesive, an adhesive tape, or an elastic clip which closely presses the cover member 121 against the front of the front member 21. This allows for an elegant external appearance of the front portion of the display unit 110 of the display apparatus 1.

A cover bent part 123 which is backward bent may be formed at an edge of the cover member 121. In addition, a cover bent accommodating part 133 to accommodate the cover bent part 123 of the cover member 121 may be formed in the front of the body 23 of the front member 21. This allows the cover member 121 to be combined to the front member 21 more stably and elegantly.

Other configurations of FIG. 12 are similar to those of the above-described exemplary embodiments, and therefore, explanation of which will be omitted.

Figure 13:
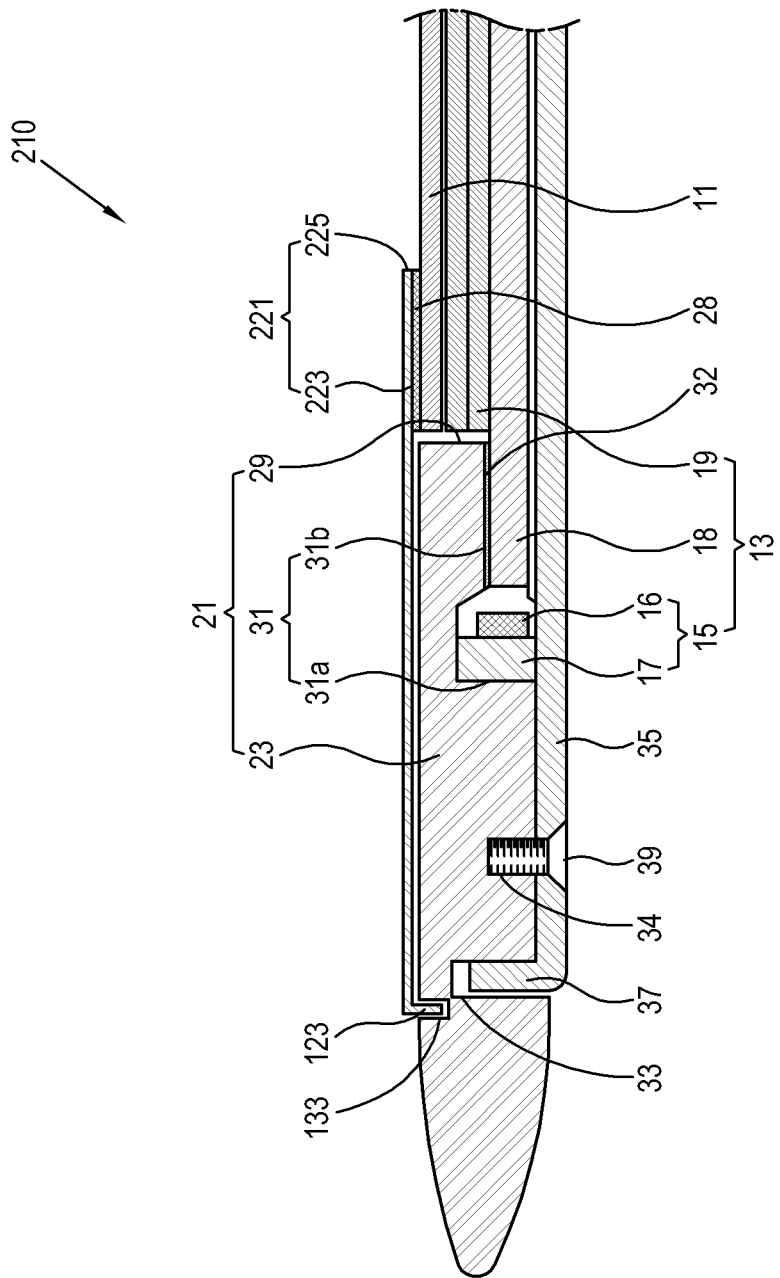

FIG. 13 is a sectional view of a display apparatus according to still another exemplary embodiment of the general inventive concept. A display unit 210 of the display apparatus 1 of the exemplary embodiment shown in FIG. 13 is characterized in that a cover member 221 arranged in the front of the front member 21 includes a cover support 223 for supporting the front of an edge of the display panel 11, and an opening 225 which is arranged in an inner end portion of the cover support 223 and exposes an image displayed on the display panel 11 frontward. That is, the display units 10 and 110 of the display apparatuses 1 of the exemplary embodiments shown in FIGS. 1 to 12 are configured such that the panel support 29 of the front member 21 supports the front of an edge of the display panel 11. In contrast, the display unit 210 of the display apparatus 1 of the exemplary embodiment shown in FIG. 13 is configured such that the cover support 223 of the cover member 221 supports the front of the edge of the display panel 11. In this case, the protection sheet 28 is interposed between the cover support 223 and the display panel 11, thereby preventing a contact surface of the display panel 11 from being scratched by the cover support 223.

Thus, by configuring the display unit 210 of the display apparatus 1 of the exemplary embodiment shown in FIG. 13 using the cover member 221 to support the display panel 11, it is possible to make the front member 21 slimmer and make an external appearance of the front portion of the display unit 210 of the display apparatus 1 more elegant.

Other configurations of FIG. 13 are similar to those of the above-described exemplary embodiments, and therefore, explanation of which will be omitted.

In this manner, as the display apparatus according to the general inventive concept is configured such that the display panel and the backlight unit are mounted on the front member, it is possible to reduce the number of parts to be assembled, which may result in lightness of the apparatus and a slimmer external appearance of the apparatus. In addition, the reduced number of parts to be assembled can facilitate assembly with a thin structure and improve productivity of the apparatus. In addition, as heat generated in the light source of the backlight unit can be also radiated through the front member made of a material having high thermal conductivity, it is possible to improve a heat radiation effect over a system to radiate the heat using only the rear member and make the display unit slimmer since no separate heat sink is used.

Although a few exemplary embodiments have been shown and described, it will be appreciated by those skilled in the art that changes may be made in these exemplary embodiments without departing from the principles and spirit of the general inventive concept, the scope of which is defined in the appended claims and their equivalents.

What is claimed is:
1. A display apparatus comprising:
a display panel which displays an image signal;
a backlight unit including a light source which emits light to be provided to the display panel;
a front member including a body whose central portion is open such that an image displayed on the display panel is frontwardly exposed, and a support unit which supports the display panel and the backlight unit in an inner side of the body; and
a rear member which is coupled to the front member and supports a back side of the backlight unit,
wherein the rear member provides at least a portion of an external appearance of the display apparatus,
wherein at least a portion of the light source contacts the rear member,
wherein at least one of the front member and the rear member is formed of a single member,
wherein the body of the front member comprises an accommodating space formed therein, the accommodating space having sides defined by two surfaces of the body which are substantially perpendicular to a surface of the display panel which displays the image signal; and
the rear member comprises a rear bent portion which is configured to be received within the accommodating space.

2. The display apparatus according to claim 1, wherein heat generated in the light source of the backlight unit is radiated through the front member.

3. The display apparatus according to claim 1, wherein the support unit of the front member includes an opening which exposes the image displayed on the display panel frontward, a panel support which accommodates and supports the display panel, and a backlight support which accommodates and supports the backlight unit.

4. The display apparatus according to claim 3, wherein the backlight unit includes a light source which emits light to be provided to the display panel, and a light guide plate which supplies the light emitted from the light source uniformly, and
wherein the light source is arranged as an edge type light source disposed along at least one lateral side of the light guide plate, and heat generated from the light source is radiated through the backlight support of the front member.

5. The display apparatus according to claim 1, wherein the light source includes at least one LED and an LED board which supports the at least one LED, and
wherein the LED board is coupled to the backlight support of the front member.

6. The display apparatus according to claim 1, wherein the front member includes a material having thermal conductivity which is higher than a predetermined threshold.

7. The display apparatus according to claim 1, wherein the rear member includes a material having thermal conductivity which is higher than a predetermined threshold.

8. The display apparatus according to claim 1, wherein the end portion is a rear bent part whose edge is frontward bent, and
the accommodating space is configured to accommodate the rear bent part of the rear member such that the front member is coupled to the rear member.

9. The display apparatus according to claim 1, further comprising a cover member which is disposed on a front side of the front member.

10. The display apparatus according to claim 9, wherein the cover member includes a cover bent part whose edge is rearward bent, and
wherein a cover bent accommodating part is disposed in the front side of the body of the front member and is configured to accommodate the cover bent part of the cover member such that the cover member is coupled to the front member.

11. The display apparatus according to claim 9, wherein the cover member includes a cover support which supports a front edge of the display panel, and an opening which is formed in an inner end portion of the cover support in order to expose the image displayed on the display panel frontward.

12. The display apparatus according to claim 4, further comprising at least one of an auxiliary sheet which is interposed between the backlight support and the light guide plate which contacts the backlight support, and a protection sheet which is interposed between the panel support and the display panel which contacts the panel support.

13. The display apparatus according to claim 1, further comprising a body unit comprising a body housing which accommodates a power board, which includes a power supply unit, and a main board, which includes an image signal receiving unit and an image processing unit, and a body connector which receives power signals from the power board and image signals from the main board;
    a panel driving board disposed on the rear member and includes a display connector; and
    a connection cable which connects the body connector to the display connector and provides the power signals and the image signals from the body connector to the display panel and the backlight unit through the display connector.

14. The display apparatus according to claim 13, further comprising a stand unit interposed between and coupled to a display unit and the body unit, where the display unit comprises the display panel, the backlight, the front member and the rear member,
    the stand unit is vertically erect and supports the display unit with respect to the body unit, and
    the connection cable is fed through an inside of the stand unit between the body connector and the display connector.

15. The display apparatus according to claim 1, further comprising a rear cover mounted on a back side of the rear member, and
    a driving circuit comprising a power supply unit, an image signal receiving unit and an image processing unit, and interposed between the rear cover and the rear member.

16. The display apparatus according to claim 1, wherein a reflection sheet for reflecting the light emitted from the light source toward the display panel is provided on the rear member.

* * * * *